United States Patent
Marche et al.

(10) Patent No.: US 9,212,764 B2
(45) Date of Patent: Dec. 15, 2015

(54) DEVICE FOR ATTACHING AN ELECTRICAL HARNESS IN AN AIRCRAFT

(71) Applicant: AIRBUS OPERATIONS (S.A.S.), Toulouse (FR)

(72) Inventors: Hervé Marche, Toulouse (FR); Jean Geliot, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 13/793,757

(22) Filed: Mar. 11, 2013

(65) Prior Publication Data
US 2013/0240682 A1 Sep. 19, 2013

(30) Foreign Application Priority Data
Mar. 15, 2012 (FR) ...................................... 12 52348

(51) Int. Cl.
*F16L 3/237* (2006.01)
*F16L 3/10* (2006.01)
(Continued)

(52) U.S. Cl.
CPC ................ *F16L 3/1075* (2013.01); *F16L 3/237* (2013.01); *F16L 55/035* (2013.01); *H02G 3/32* (2013.01)

(58) Field of Classification Search
CPC ............... F16L 3/222; F16L 3/02; F16L 3/00; F16L 3/1222; F16L 3/18; F16L 3/227; F16L 3/26; F16L 5/14; F16L 3/237; F16L 3/2235; F16L 55/035; F16L 3/223; F16L 3/22; F16L 3/13; H02G 3/26; H02G 3/32; H02G 3/263; B60R 16/0215; F16B 3/00

USPC ......... 248/65, 68.1, 73, 74.1–74.2, 74.4, 604, 248/55, 67, 74.3, 74.5, 70–72, 49, 51, 67.7
See application file for complete search history.

(56) References Cited

U.S. PATENT DOCUMENTS

| | | | | |
|---|---|---|---|---|
| 1,808,516 A | * | 6/1931 | Bartsch | 248/67 |
| 2,761,714 A | * | 9/1956 | Cuskie | 403/225 |
| 3,061,253 A | * | 10/1962 | Keaton | 248/74.1 |

(Continued)

FOREIGN PATENT DOCUMENTS

| CN | 202 084 874 | 12/2011 |
|---|---|---|
| DE | 10 2010 022194 | 11/2011 |

(Continued)

OTHER PUBLICATIONS

French Search Report for Application No. FR 12 52348 dated Nov. 27, 2012.

*Primary Examiner* — Nkeisha Smith
(74) *Attorney, Agent, or Firm* — Jenkins, Wilson, Taylor & Hunt, P.A.

(57) ABSTRACT

A device for attaching an electrical harness on a structure of an aircraft comprising a support connected to the structure, the harness following a path direction, characterized in that it comprises a body with at least two jaws, at least one of the jaws being movable along a reference plane perpendicular to the path direction between a first open position in which they enable the insertion of at least one harness and a second closed position in which they keep the inserted harness or harnesses in position, and on the other hand, a retainer strip in the form of a blade whose ends are connected to the support allowing for the jaws to be maintained in closed position and the body to be flattened against the support.

9 Claims, 3 Drawing Sheets

(51) Int. Cl.
*H02G 3/32* (2006.01)
*F16L 55/035* (2006.01)

(56) References Cited

U.S. PATENT DOCUMENTS

| | | | | |
|---|---|---|---|---|
| 3,066,902 | A * | 12/1962 | Conil | 248/73 |
| 3,244,388 | A * | 4/1966 | Coffman | 248/62 |
| 3,286,963 | A * | 11/1966 | Bergman | 248/74.2 |
| 3,521,842 | A * | 7/1970 | Opperthauser | 248/74.2 |
| 3,529,795 | A * | 9/1970 | Van Niel | 248/71 |
| 3,684,223 | A * | 8/1972 | Logsdon | 248/74.3 |
| 4,127,315 | A * | 11/1978 | McKee | 439/468 |
| 4,251,844 | A * | 2/1981 | Horstmann | 361/1 |
| 4,432,592 | A * | 2/1984 | Boutros et al. | 439/460 |
| 4,441,619 | A * | 4/1984 | Gibitz | 211/70.6 |
| 4,457,482 | A * | 7/1984 | Kitagawa | 248/74.3 |
| 4,679,754 | A * | 7/1987 | Richards | 248/68.1 |
| 4,840,333 | A * | 6/1989 | Nakayama | 248/68.1 |
| 4,896,465 | A * | 1/1990 | Rhodes et al. | 451/523 |
| 4,934,635 | A * | 6/1990 | Sherman | 248/74.1 |
| 5,014,940 | A * | 5/1991 | Sherman | 248/74.1 |
| 5,215,281 | A * | 6/1993 | Sherman | 248/74.1 |
| 5,234,185 | A * | 8/1993 | Hoffman et al. | 248/56 |
| 5,257,788 | A | 11/1993 | Juenemann et al. | |
| 5,263,671 | A * | 11/1993 | Baum | 248/68.1 |
| 5,626,316 | A * | 5/1997 | Smigel et al. | 248/68.1 |
| 5,669,590 | A * | 9/1997 | Przewodek | 248/68.1 |
| 5,718,403 | A * | 2/1998 | Ott et al. | 248/228.1 |
| 6,105,216 | A * | 8/2000 | Opperthauser | 24/459 |
| 6,126,119 | A * | 10/2000 | Giangrasso | 248/58 |
| 6,164,603 | A * | 12/2000 | Kawai | 248/73 |
| 6,193,195 | B1 * | 2/2001 | Owens | 248/68.1 |
| 6,561,466 | B1 * | 5/2003 | Myers et al. | 248/74.4 |
| 6,724,637 | B2 * | 4/2004 | Li et al. | 361/760 |
| 6,899,304 | B2 * | 5/2005 | Bellmore et al. | 248/65 |
| 7,304,861 | B2 * | 12/2007 | Takahashi | 361/760 |
| 7,770,848 | B2 * | 8/2010 | Johnson et al. | 248/65 |
| 7,963,056 | B1 * | 6/2011 | Mangone, Jr. | 40/316 |
| 8,074,945 | B2 * | 12/2011 | Schoenau et al. | 248/74.4 |
| 8,240,625 | B2 * | 8/2012 | Kato | 248/304 |
| 8,291,551 | B2 * | 10/2012 | Bruss et al. | 24/16 R |
| 8,598,462 | B2 * | 12/2013 | Li | 174/135 |
| 8,604,344 | B2 * | 12/2013 | Wang et al. | 174/135 |
| 8,757,560 | B2 * | 6/2014 | Darnell | 248/63 |
| 2005/0284989 | A1 * | 12/2005 | Mizukoshi | 248/65 |
| 2013/0114236 | A1 * | 5/2013 | Parry-Jones et al. | 361/826 |
| 2013/0313375 | A1 * | 11/2013 | Dworak, Jr. | 248/74.2 |
| 2014/0131529 | A1 * | 5/2014 | Feige | 248/74.5 |
| 2014/0291455 | A1 * | 10/2014 | Struck et al. | 248/68.1 |

FOREIGN PATENT DOCUMENTS

| | | |
|---|---|---|
| EP | 0490157 | 6/1992 |
| WO | WO 2008/001313 | 1/2008 |
| WO | WO 2011/144339 | 11/2011 |

* cited by examiner

DEVICE FOR ATTACHING AN ELECTRICAL HARNESS IN AN AIRCRAFT

TECHNICAL FIELD

The present invention relates to a device for attaching an electrical harness in an aircraft.

BACKGROUND

In a known manner, an electrical harness comprises several conductor elements which are maintained against one another in a braided sheath. Each harness must be maintained in position over the entire length thereof so as to not interfere with other elements.

This constraint is essential in the area of certain confined zones of an aircraft such as, for example, a pylon which ensures the connection between an engine and the remainder of the aircraft. The pylon must ensure, not only the mechanical recovery of the forces but also enable the routing of numerous fluid conduits such as kerosene, for example, and numerous electrical cables grouped together in the form of a harness such as, for example, a harness grouping together power supply cables which supply the aircraft with electrical energy, or harnesses for communication cables for transmitting commands or signals between the engine and the remainder of the aircraft.

To ensure the different harnesses are maintained along a given position, attachment devices are used and distributed along the path of the harnesses.

SUMMARY

FIG. 1 schematically shows, a portion of a support 10 connected to the structure of a pylon to which harnesses 12.1 to 12.4 are attached. To attach them, the support 10 comprises a wing 14 extending along a plane substantially parallel to the path direction of the harnesses. Each harness 12.1 to 12.4 comprises a specific attachment 16.1 to 16.4 connected to a support 10 by an assembly constituted of a screw 18, a nut 20, and a washer 22.

Each attachment 16.1 to 16.4 is in the form of a loop-shaped metallic strip whose ends, referred to as tabs 24, 24', are flattened against one another and affixed to the support with a screw/nut/washer assembly. To reduce the number of parts, the same screw/nut/washer assembly is used to affix two harnesses. In this case, a spacer 26 is sandwiched between the tabs 24, 24' of the two attachments 16.1 and 16.2 (or 16.3 and 16.4).

According to this embodiment, it is necessary to provide eleven elements for each support 10. In the case of a pylon, twelve supports must be provided, which means there are one hundred and thirty-two elements to be assembled.

Such a large number of elements tends to necessarily impact the assembly time, increase the onboard weight, and make managing the parts more complicated.

Therefore, the present invention aims at overcoming the drawbacks of the prior art.

To this end, the invention proposes a device for attaching an electrical harness to an aircraft structure comprising a support connected to the structure, the harness following a path direction characterized in that it comprises a body with at least two jaws, at least one of the jaws being movable along a reference plane perpendicular to the path direction between a first open position in which they allow at least one harness to be inserted, and a second closed position in which they maintain the inserted harness or harnesses in position, and on the other hand, a retainer strip in the form of a blade whose ends are connected to the support allowing for the jaws to be maintained in closed position and for the body to be flatten against the support.

This arrangement makes it possible, with two elements, namely the body and the retainer strip, to maintain several harnesses, which tends to reduce the number of elements required for connecting the harness or harnesses to the structure.

Preferably, the body comprises three jaws, a first jaw which cooperates with two jaws, each connected to the first jaw via an articulation zone. This configuration makes it possible to attach several harnesses with the same body.

Advantageously, the articulation zones are spaced as far away as possible so that the openings of the jaws are oriented toward one another in order to better maintain the harnesses.

Preferably, the retainer strip is a spring blade. This solution makes it possible to use the spring effect of the blade to quickly affix the latter to the support.

According to an embodiment, the support comprises at least one slot and at least one end of the retainer strip is curved upon itself so as to form a first rectilinear portion, a curved portion, and a second rectilinear portion, the distance between the two rectilinear portions increasing in a direction going away from the curved portion in order to allow said end to be inserted in the slot and to prevent it from escaping without a pinching action that tends to move the two rectilinear portions closer together.

According to an embodiment, the other end of the retainer strip has an L shape, the foot of the L being inserted in a slot provided in the support so as to retain the retainer strip.

Advantageously, each jaw comprises, for each harness, a semi-cylindrical cavity, the cavities of two jaws being arranged as a pair, facing one another, when the jaws are in the closed position in order to define a passage having a substantially cylindrical shape.

BRIEF DESCRIPTION OF THE DRAWINGS

Other characteristics and advantages will become apparent from the description of the invention that follows, a description given only by way of non-limiting example, with reference to the annexed drawings, wherein.

DETAILED DESCRIPTION

Figure 1:
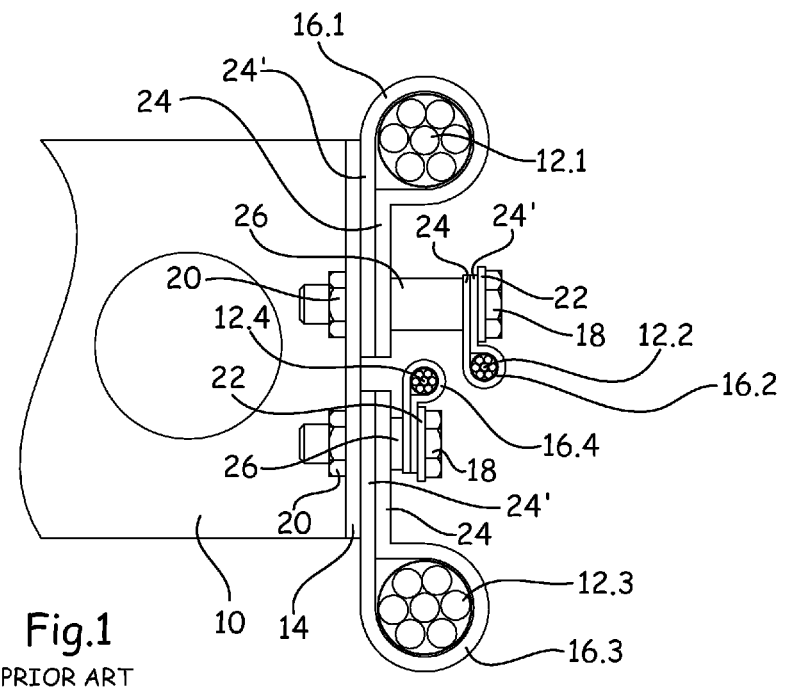
FIG. 1 is a cross-section showing the different elements required for attaching several harnesses onto a support according to the prior art.
Figure 2:
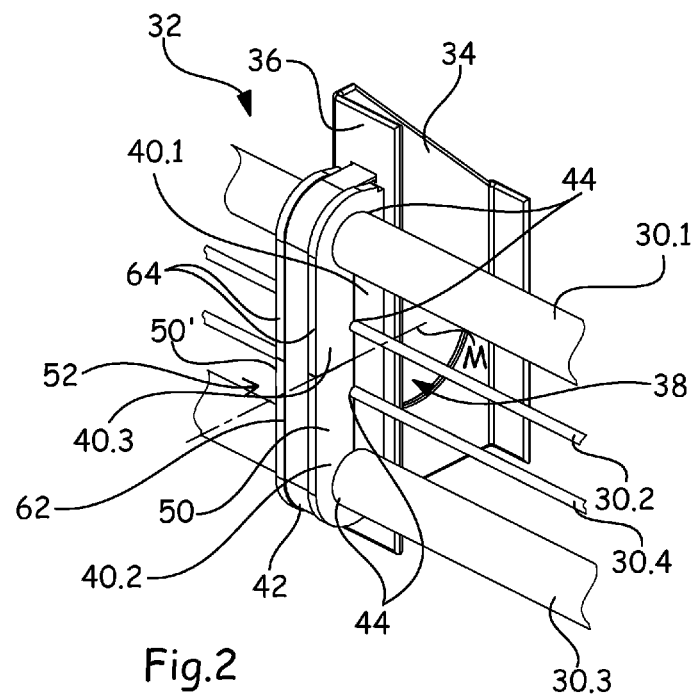
FIG. 2 is a perspective view of a device for attaching several harnesses according to the invention.
Figure 3:
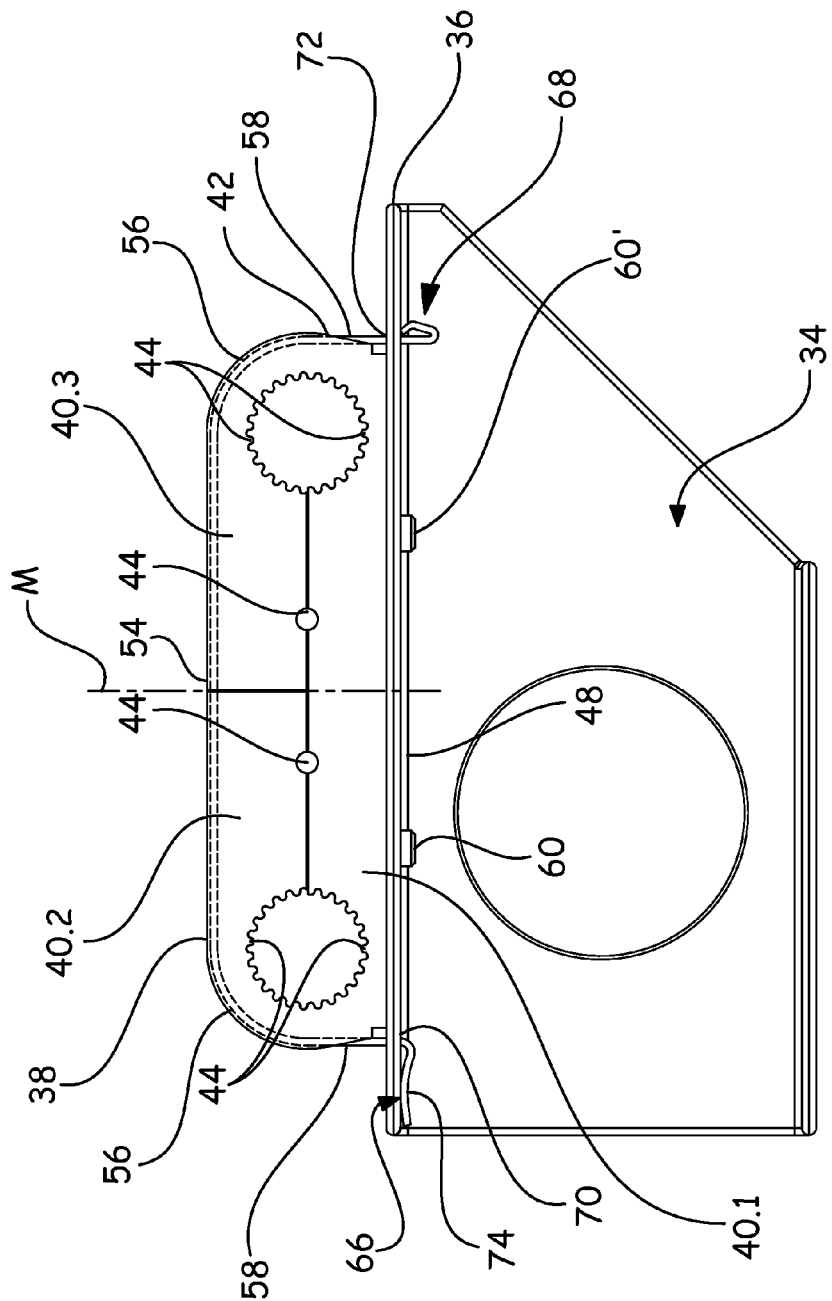
FIG. 3 is a side view of an attachment device according to the invention.

FIG. 2 shows four electrical harnesses 30.1 to 30.4 capable of being attached by an attachment device 32 to the structure of an aircraft pylon. As for the prior art, in the case of a pylon, twelve attachment devices 32 allow the harnesses 30.1 to 30.4 to be maintained in position along a given path.

As for the prior art, an attachment device comprises a support 34 connected by any suitable means to the aircraft structure, and which comprises a support surface in the form of a wing 36 oriented parallel to the path direction of the harnesses. The supports 34 and their attachments to the pylon structure are not further described since they are known to one having ordinary skill in the art.

Although described as being applied to electrical harnesses following a path in an aircraft pylon, the invention is not limited to this application. Thus, the attachment device described can be used to affix at least one electrical harness to the structure of an aircraft no matter the aircraft zone.

According to the invention, the attachment device 32 comprises, in addition to the support 34, on the one hand, a body 38 with at least two jaws 40.1 and 40.2, at least one of the jaws being movable along a reference plane perpendicular to the path direction between a first open position in which they enable the insertion of at least one harness and a second closed position in which they maintain the inserted harness or harnesses in position, and on the other hand, a retainer strip 42 for maintaining the jaws in closed position and the body flattened against the support 34.

Preferably, at least one of the jaws 40.1 and 40.2 comprises a cavity 44 whose shape conforms to at least one portion of the section of the harness. According to a preferred embodiment, each jaw comprises, for each harness, a semi-cylindrical cavity 44, the cavities 44 of two jaws being arranged as a pair facing each other when the jaws are in the closed position. For each pair thus formed, the cavities 44 define a passage having a substantially cylindrical shape oriented along the path direction of the harnesses and whose diameter is substantially equal to the outer diameter of the section of harness maintained.

Figure 4:
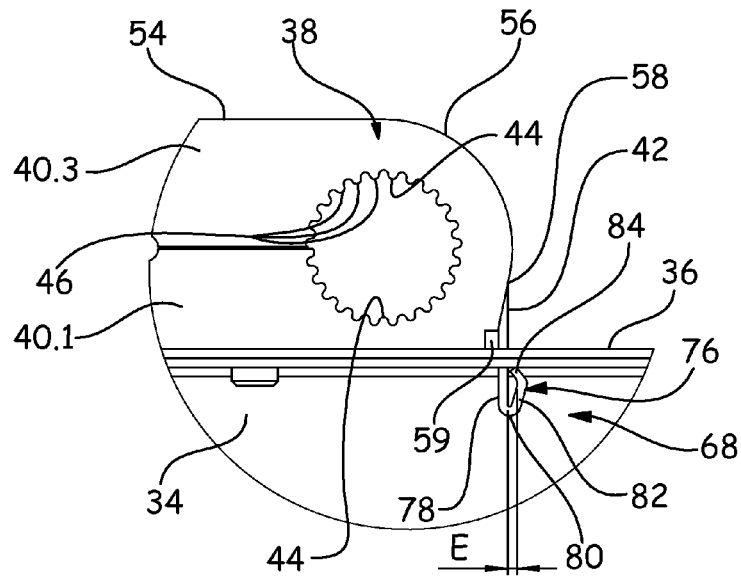
FIG. 4 is a side view showing, in detail, a portion of the attachment device according to FIG. 3.

Advantageously, at least one cavity 44 comprises channels 46 as shown in FIG. 4, oriented along the path direction of the harnesses. This profile enables the same cavity to adapt to a variety of diameters for the harness ranging, for example, from 14 to 17 mm.

According to an embodiment, the body 38 comprises a contact surface 48 taking support against the support 34, and more particularly against the wing 36 when the device is attached, and two end planar surfaces 50, 50', parallel to one another, perpendicular to the surface 48 and to the path direction of the harnesses.

In addition, the body 38 comprises a flank 52 whose width is equal to that of the contact surface 48, which extends between the two end surfaces 50 et 50', the flank 52, and the surfaces 48, 50, 50' defining a volume corresponding to that of the body. The flank 52 is perpendicular to the reference plane.

The retainer strip is flattened against at least one portion of the flank 52. According to an embodiment, the flank 52 is symmetrical with respect to a median plane M perpendicular to the contact surface 48 and parallel to the path direction of the harnesses. It comprises a central portion 54, planar and parallel to the contact surface 48, extended on both sides by curved portions 56, themselves extended by planar lateral surfaces 58 which extend up to the contact surface 48. Preferably, the spacing between the two lateral surfaces 58 increases while going away from the contact surface 48. This arrangement facilitates the setting in place of the retainer strip 42.

Preferably, the junction between the contact surface 48 and the lateral surfaces 58 comprises a cut-out 59 (shown in FIG. 4).

Advantageously, the body comprises means for immobilizing it in translation along the path direction of the harnesses. To this end, the contact surface 48 comprises at least one pin 60 which becomes housed in a cavity having an identical shape provided in the support 34. According to an embodiment, the pin is cylindrical and the corresponding housing is also cylindrical and has a diameter equal to that of the pin. This arrangement makes it possible to immobilize the body according to two translations parallel to the surface 48.

Preferably, the body comprises means for preventing it from pivoting about an axis perpendicular to the contact surface 48. According to an embodiment, the contact surface 48 comprises two pins 60 and 60' which become housed each in a cavity having an identical shape provided in the support 34.

The fact that the body 38 is in planar contact with the support 34 and that it is maintained by the retainer strip 42 makes it possible to immobilize it along the two other rotations and along the translation perpendicular to the contact surface 48. Thus, the body is perfectly immobilized.

Advantageously, the body comprises means for positioning the retainer strip 42. To this end, the flank 52 comprises a groove 62 extending over at least a portion of the flank and whose width is equal to that of the retainer strip 42. Thus, the edges 64 arranged on both sides of the groove 62 ensure the immobilization of the retainer strip 42 in the groove 62.

According to a preferred embodiment, the groove 62 extends over the entire length of the flank 52.

Preferably, the body 38 comprises three jaws, a jaw 40.1 which cooperates with two jaws 40.2 and 40.3. According to an embodiment, the first jaw, referred to as a lower jaw 40.1, corresponds to the half of the body 38 flattened against the support. The two other jaws 40.2 and 40.3 are articulated with respect to the first jaw 40.1 and are symmetrical with respect to the median plane M. Thus, the left upper jaw 40.2 corresponds to the left upper quarter of the body 38 and the right upper jaw 40.3 corresponds to the right upper quarter of the body 38.

Advantageously, the left 40.2 and right 40.3 upper jaws are articulated with respect to the lower jaw 40.1 in the area of the lateral surfaces 58, namely, at the opposite of the median plane M. Thus, according to the invention, the articulation zones are spaced apart as far as possible so that the openings of the jaws are oriented toward one another.

Having the cut-out 59 improves the hinge effect during the opening of the jaws 40.2 and 40.3.

Preferably, each left 40.2 or right 40.3 upper jaw comprises at least one cavity 44. In addition, the lower jaw 40.1 comprises at least two cavities 44 arranged opposite cavities 44 provided in the area of the jaws 40.2 and 40.3.

As shown in the different drawings, each upper left 40.2 or right 40.3 jaw comprises two cavities and the lower jaw 40.1 four cavities.

Preferably, the cavities having the largest diameter are arranged in the vicinity of the lateral surfaces 58.

For each upper jaw 40.2 or 40.3, the zone between the lateral surface 58 and the closest cavity forms an articulation between each upper jaw and the lower jaw, allowing the passage from the open position to the closed position and vice versa. Advantageously, the distance between the lateral surface 58 and the closest cavity is substantially equal to the distance which separates the cavity from the curved portion 56 and that which separates the cavity from the contact surface 48.

According to an embodiment, the body 38 is made from elastomer.

According to a characteristic of the invention, the retainer strip 42 is in the form of a U-shaped metallic blade whose ends 66 and 68 are connected to the support 34.

Preferably, the retainer strip 42 is a spring blade. Thus, it is made from a material providing it with a certain spring effect. According to an embodiment, the retainer strip is made from stainless steel.

To ensure the connection between the retainer strip 42 and the support 34, the wing 36 comprises two substantially rectangular slots 70 and 72 whose length is equal, give or take the play, to the width of the retainer strip 42. The width of the slots 70 and 72 is determined so as to enable the insertion of the ends 66 and 68 of the retainer strip 42 and their retaining after the insertion.

In addition, the retainer strip 42 comprises, in the area of the end 66, an L shape, the foot of the L 74 being inserted in one of the two slots 70 so as to retain the retainer strip.

At the opposite, the end 68 is curved upon itself so as to form a loop 76. This loop 76, shown in detail in FIG. 4, comprises a first rectilinear portion 78, a curved portion 80, a second rectilinear portion 82, and a last portion 84 curved in the direction of the curved or portion 80. According to an important feature, the distance between the two rectilinear portions 78 and 82 increases in a direction going away from the curved portion 80 in order to enable the insertion of the end 68 in the slot and prevent its removal without a pinching action tending to moving the two portions 78 and 82 closer.

Thus, in the rest state, the two rectilinear portions 78 and 82 are spaced apart by a certain distance E. When they are pinched or during the insertion of the end 68 in a slot, the two portions 78 and 82 are spaced apart by a distance shorter than E and return to the rest state due to the spring effect of the retainer strip 42.

The slot 72 has a width adapted to enable the insertion of the end 68 when the two rectilinear portions 78 and 82 are moved closer together and to prevent the removal of the end 68 when the two rectilinear portions 78 and 82 are in the rest state.

According to another alternative, the two ends of the retainer strip can have the same profile as the end 68.

The attachment device is relatively easy to use.

Figure 5A:
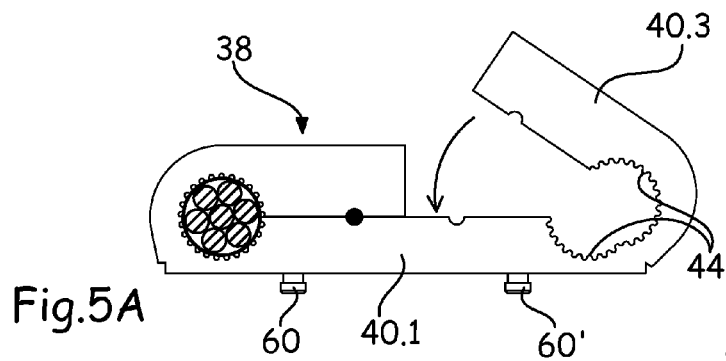
FIGS. 5A to 5C are different views showing the setting in place of the attachment device according to the invention.

As shown in FIG. 5A, the harnesses are first set in place between the jaws of the body 38. Then the body 38 is placed on the support 34 and the first end 66 of the retainer strip is inserted in the slot 70 of the support as shown in FIG. 5B.

Figures 5B, 5C:
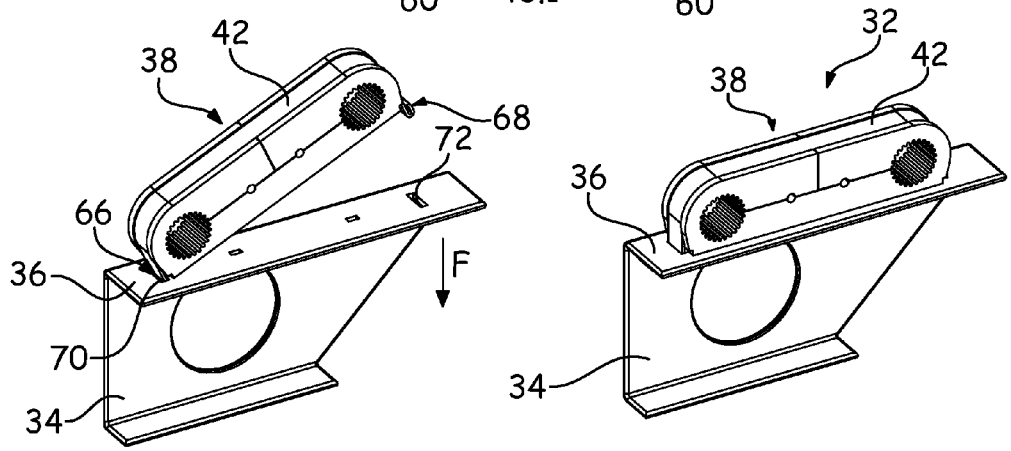

Subsequently, the second end 68 of the body is inserted in the slot 72 by exerting a force F along the direction of the support, as shown in FIG. 5C. During this insertion, the two rectilinear portions 78 and 82 come closer. After the passage of the curved portion 84, the two rectilinear portions 78 and 82 move away due to the spring effect and prevent the removal of the end 68. The harnesses are then attached to the support.

To disassemble the attachment device, one only has to pinch the two rectilinear portions 78 and 82 to enable the end 68 to exit.

The attachment device provides the following advantages: As indicated above, its setting in place is relatively simple and requires no tool. The number of elements set in place in the area of a pylon is greatly reduced insofar as only two elements per support are needed, which means a total of 24 elements per pylon against one hundred and thirty-two for the prior art. Thus, the time required for setting in place the harness is greatly reduced. In addition, the management of the elements necessary to the attachment of the harnesses is also greatly simplified insofar as only three references (support/body/retainer strip) remain to be managed.

The modifications made to the support are minor. Thus, with respect to a support of the prior art which provides two holes, a support adapted to the invention comprises two holes for the pins and two slots.

Finally, the device allows a weight saving on the order of 0.5 kg for each pylon.

The invention claimed is:

1. An attachment device for attaching an electrical harness on a structure of an aircraft, the attachment device comprising:
   a support connected to the structure;
   a body with at least two jaws, at least one of the jaws being movable along a reference plane perpendicular to a path direction between a first open position in which the at least two jaws enable an insertion of at least one harness and a second closed position in which the at least two jaws keep an at least one harness in a position; and
   a retainer strip in a form of a blade comprising free ends that are attachably inserted within the support allowing for the at least two jaws to be maintained in the second closed position and the body to be flattened against the support;
   wherein the at least one harness follows the path direction; and
   wherein the body comprises three jaws, a first jaw which cooperates with the at least two jaws, each connected to the first jaw via an articulation zone, the articulation zones being spaced apart as far as possible so that openings of the at least two jaws are oriented toward one another.

2. The attachment device according to claim 1, wherein the retainer strip is flattened against at least one portion of a flank of the body which is perpendicular to the reference plane.

3. The attachment device according to claim 2, wherein the flank comprises a groove to house the retainer strip.

4. The attachment device according to claim 1, wherein the retainer strip is a spring blade.

5. The attachment device according to claim 4, wherein the support comprises at least one slot and at least one of the free ends of the retainer strip is curved upon itself so as to form a first rectilinear portion, a curved portion, and a second rectilinear portion, a distance between the first and second rectilinear portions increasing in a direction going away from the curved portion in order to enable insertion of the at least one of the free ends in the at least one slot and to prevent removal of the at least one of the free ends without a pinching action tending to move the first and second rectilinear portions closer together.

6. The attachment device according to claim 5, wherein the other free end of the retainer strip comprises an L shape, a foot of the L shape being inserted in a slot provided in the support so as to retain the retainer strip.

7. The attachment device according to claim 1, wherein the body comprises at least one pin for immobilizing the body in translation along the path direction.

8. The attachment device according to claim 1, wherein the at least one of the jaws comprises at least one cavity whose shape conforms to at least one portion of a section of the harness.

9. The attachment device according to claim 8, wherein the at least one cavity comprises channels oriented along the path direction.

* * * * *